US009800985B1

(12) United States Patent
Wojtowycz

(10) Patent No.: US 9,800,985 B1
(45) Date of Patent: Oct. 24, 2017

(54) WIRELESS MICROPHONE LOCATOR LIGHT

(71) Applicant: Harman International Industries, Incorporated, Stamford, CT (US)

(72) Inventor: Emilian Christopher Wojtowycz, Salt Lake City, UT (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 15/170,341

(22) Filed: Jun. 1, 2016

(51) Int. Cl.

| | |
|---|---|
| ***H04B 3/00*** | (2006.01) |
| ***H04R 29/00*** | (2006.01) |
| ***H04R 3/00*** | (2006.01) |
| ***H04R 1/08*** | (2006.01) |

(52) U.S. Cl.
CPC ............. *H04R 29/004* (2013.01); *H04R 1/08* (2013.01); *H04R 3/005* (2013.01); *H04R 2420/07* (2013.01)

(58) Field of Classification Search
CPC ........ H04R 29/004; H04R 1/08; H04R 3/005; H04R 2420/07
USPC ...................................... 381/77, 79, 118–119
See application file for complete search history.

(56) References Cited

U.S. PATENT DOCUMENTS 6,498,853 B2 * 12/2002 Paritsky .................. G01H 9/00 381/172
7,436,970 B2 * 10/2008 Mercs ....................... H04S 1/00 381/119
2007/0186656 A1 * 8/2007 Goldberg ................ G01H 3/14 73/647
2014/0126740 A1 * 5/2014 Charles ................ H04R 1/1066 381/74
2016/0128114 A1 * 5/2016 Moy ..................... H04W 12/06 455/434

* cited by examiner

*Primary Examiner* — Disler Paul
(74) *Attorney, Agent, or Firm* — Brooks Kushman, P.C.

(57) ABSTRACT

An apparatus for identifying associated channel assignments for wireless microphones, the apparatus may include a wireless microphone configured to communicate with an audio mixing console. The microphone includes a processor and a display. The processor may be configured to receive a microphone identifier command including a channel indicator for indicating a mixing console channel and an illumination color corresponding to the channel indicator, determine whether the wireless microphone is associated with the mixing console channel. The processor may be further configured to illuminate, in response to the wireless microphone being associated with the mixing console channel, the display according to the illumination color.

20 Claims, 4 Drawing Sheets

WIRELESS MICROPHONE LOCATOR LIGHT

TECHNICAL FIELD

Embodiments disclosed herein generally relate to a wireless microphone locator light.

BACKGROUND

During concerts and performances, several instruments and microphones may be used by various musicians and singers. Each device may be associated with a certain mixing console channel, and a technician may apply various audio processing techniques to the sound created by the devices of a respective channel. When on stage, these devices may be moved around and handed from one musician to another during a performance. Tracking of these devices during stage performances may be difficult, making correlations between the device and the respective mixing console channel and applying audio processing techniques difficult.

SUMMARY

An apparatus for identifying associated channel assignments for wireless microphones, the apparatus may include a wireless microphone configured to communicate with an audio mixing console. The microphone includes a processor and a display. The processor may be configured to receive a microphone identifier command including a channel indicator for indicating a mixing console channel and an illumination color corresponding to the channel indicator, determine whether the wireless microphone is associated with the mixing console channel. The processor may be further configured to illuminate, in response to the wireless microphone being associated with the mixing console channel, the display according to the illumination color.

A wireless microphone may include a processor and a display. The processor may be configured to receive a microphone identifier command including a channel indicator for indicating a mixing console channel and an illumination color corresponding to the channel indicator. The processor may be further configured to determine whether the wireless microphone is associated with the mixing console channel and to illuminate, in response to the wireless microphone being associated with the mixing console channel, the display according to the illumination color.

A method for identifying associated channel assignments for wireless microphones may include receiving a microphone identifier command including a channel indicator for indicating a mixing console channel and an illumination color corresponding to the channel indicator. The method may further include determining whether a wireless microphone is associated with the mixing console channel and illuminating, in response to the wireless microphone being associated with the mixing console channel, a display on the wireless microphone according to the illumination color.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is an audio system including a wireless microphone with an indicator light. The indicator light may provide a visual indication of which channel the microphone is associated with in order to allow technicians and users at an audio mixing console to easily identify the channel association thereof. When multiple wireless microphones are in use during a performance or concert, especially hand-held microphones, the microphones may be moved about the stage and often handed off from one performer to another. Due to the mobility of the wireless microphones, it may be difficult to identify and keep track of the various microphones throughout a performance. To help reduce confusion by the front of house engineers, uniquely colored pieces of tape are placed on the bottom of the microphones to help identify each microphone. However, identifying the microphones with tape may cause distractions, appear unprofessional, and be cumbersome to manage. The audio system disclosed herein provides for a quick visual verification for channel association that is flexible, customizable, and less distracting to the audience. Furthermore, the illumination may be beneficial in low-light situations, where other identifiers such as colored strips may not be visible. Furthermore, often times for specific performances such as televised awards, colored strips are not preferred or even permitted.

Figure 1:
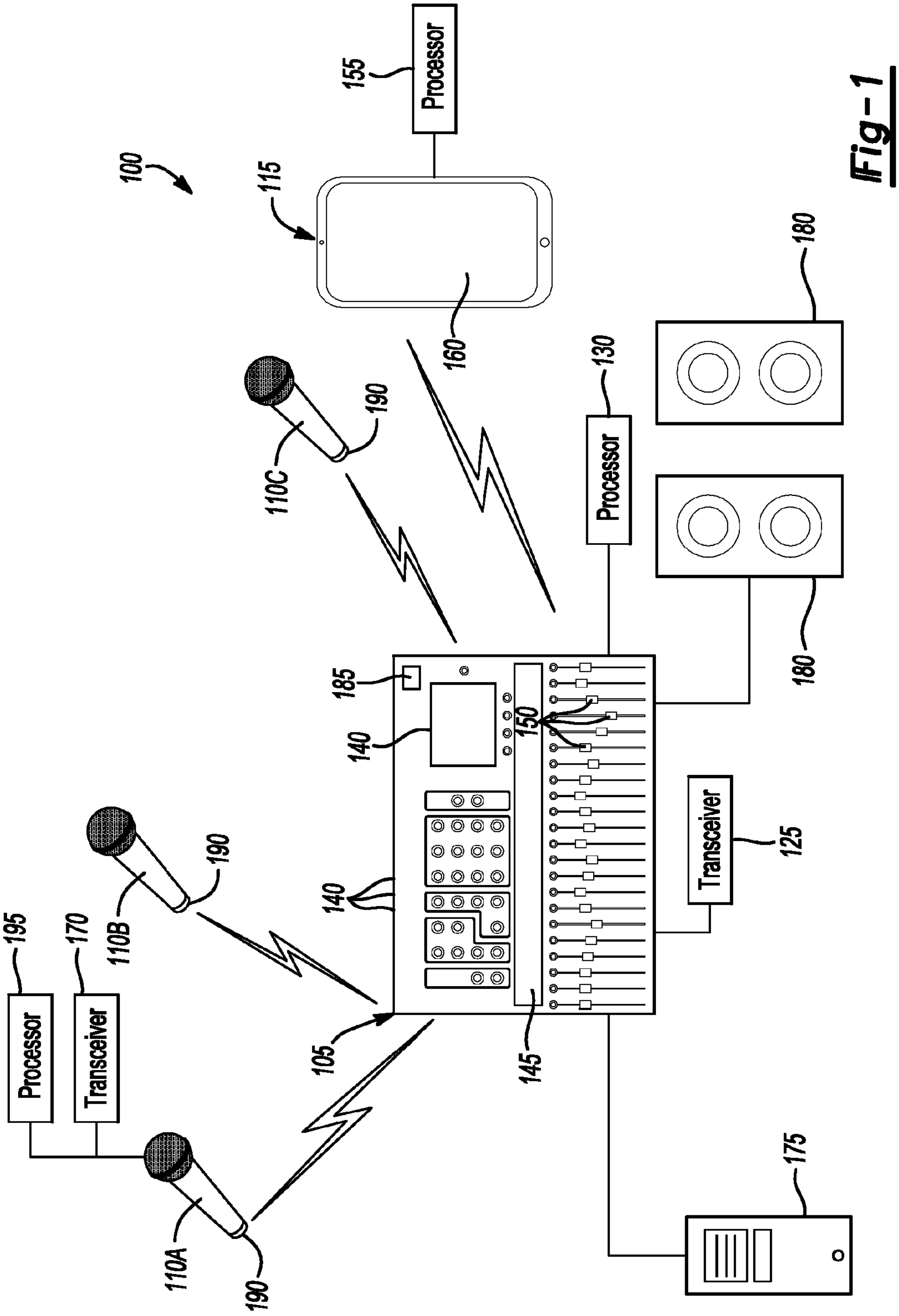
FIG. 1 is a diagram for an audio system in accordance with one embodiment.

FIG. 1 is a diagram of an audio system 100 including an audio mixing console 105 (also referred to herein as console 105) configured to communicate with one or more microphones 110A-110C (collectively referred to as microphones 110 and single microphone 110). The console 105 may be an audio mixer, a sound board or a mixer contained within a personal computer (PC) as part of a stand-alone mix application or a digital audio workstation mixer. While the console 105 is shown as a mixing console 105 separate from a computing device 175, the console 105 may include the computing device 175. The console 105 may be configured to combine various incoming audio signals received at various input ports thereon from instruments (not shown) and the microphones 110. The mixing console 105 may also be configured to alter the dynamics of the incoming and outgoing signals.

The mixing console 105 may include a transceiver 125 or wireless access point for receiving and transmitting wireless signals. The mixing console 105 may also include a processor 130 to execute a number of functions associated with the console 105 disclosed herein. The processor 130 may be configured to analyze the incoming signals. The processor 130 may also instruct the transceiver 125 to transmit certain data and messages.

The mixing console 105 may have a console display 140. The console display 140 may be an electronic visual display for displaying relevant interfaces to a user of the console 105. The display 140 may be a touchscreen and respond to various user inputs such as to a user's finger, stylus, etc. The display 140 may also be a liquid crystal display (LCD), plasma panel, light emitting diode (LED) display, etc. The display 140 may display information and facilitate the use of the console 105 by users. An example display 140 and interface will be discussed in detail below with respect to FIGS. 3A, B.

Additionally or alternatively, the mixing console 105 may have a display strip 145. The display strip 145, similar to the console display 140, may be an electronic visual display. The display strip 145 may be arranged above the faders 150 on the console 105 and may be configured to display labels for each of the channels associated with the faders 150. The labels may also be arranged above or below the faders 150, or near each channel fader 150.

Figure 3A:
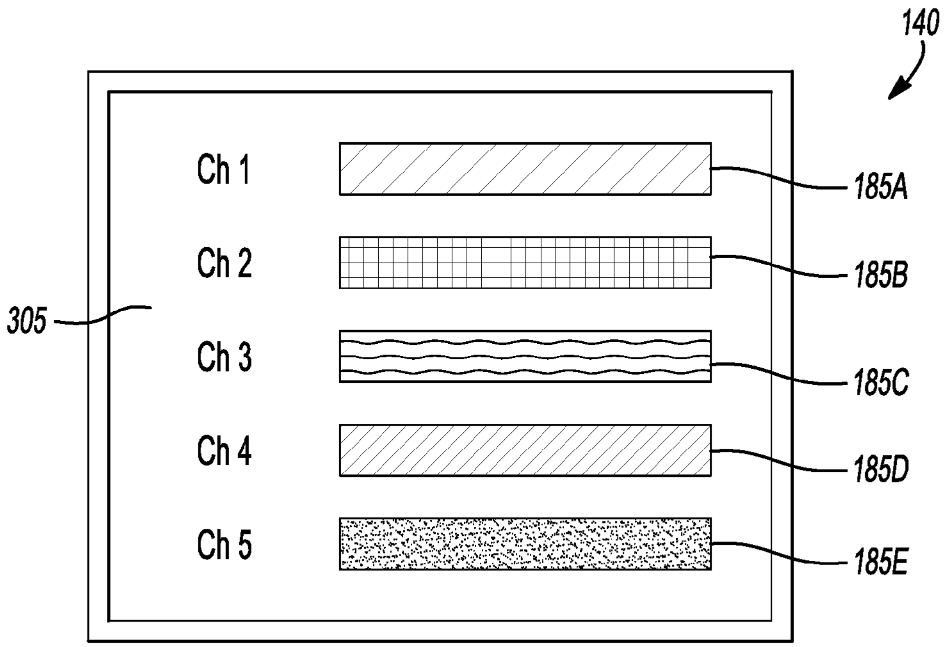
FIGS. 3A and 3B illustrate example interfaces for the audio system in accordance with one embodiment.
Figure 3B:
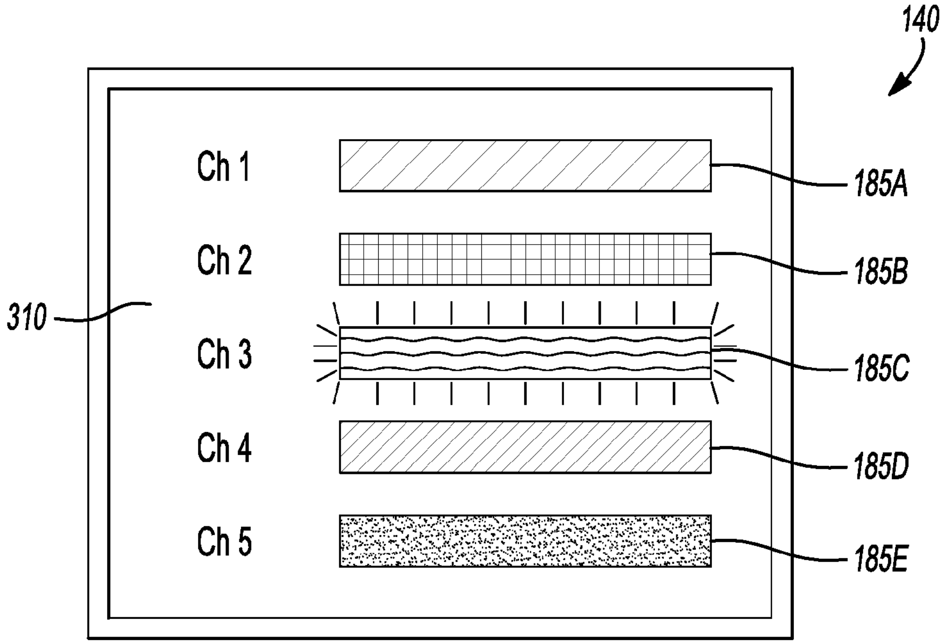

The mixing console 105 may include at least one button 185 arranged on the face thereof, as illustrated in FIG. 1. Additionally or alternatively, the button may be presented at the console display 140, display strip 145, and/or mobile device display 160. Example displays and interfaces are illustrated in FIGS. 3A and 3B. Upon selection of the button 185, the processor 130 may instruct the transceiver 125 to transmit a wireless microphone identifier command to at least one of the microphones 110. The wireless microphone identifier command may include instructions to illuminate a portion of a specific microphone 110 associated with a specific channel. The microphone identifier command may include a high frequency signal including digitized pulses of channel information associated with a main frequency.

The microphone identifier command may instruct the microphone 110 to identify itself by identifying an illumination color associated with a specific mixing console channel. For example, the first channel on the console 105 may correspond to the color green. Upon selecting the button 185 at the console, the microphone identifier command may be transmitted to the microphones 110. The microphone identifier command may include a channel indicator indicating which channel the user wishes to identify, as well as an illumination color. The microphones 110, upon receiving the microphone identifier command, may determine whether the respective microphone is associated with the channel indicator included in the command. If a microphone 110 determines that it is associated with the channel indicator, a microphone display 190 (as described below) of that microphone may in turn illuminate in the specific color dictated by the command. As explained in the example above, the microphone 110 associated with a first channel may be illuminated green.

Subsequently, the processor 130 may instruct the transceiver 125 to transmit a second wireless microphone identifier command which may indicate an illumination color that is associated with the second channel of the mixing console 105. Upon receiving the identifier command, the microphone 110 associated with the second channel may illuminate a red color. Additionally or alternative, each illumination color and channel association may be transmitted in a single wireless microphone identifier command.

Accordingly, regardless of the location of each microphone 110 (e.g., the location on a stage), a user at the console 105 may be able to identify which microphone 110 is associated with each channel. This may be especially helpful in a situation where the microphones 110 are wireless microphones and are continuously being passed between singers on stage. The user at the console 105 may be able to quickly identify which channel the microphone 110 is associated with in the event that the user loses track of each microphone's respective location and/or singer.

As explained, the microphone identifier command may include a high frequency signal including digitized pulses of channel information, including a channel indicator and illumination color, associated with a main frequency. The command may be transmitted using a wireless protocol such as HiQNet™ protocol, standard Ethernet® protocol TCP packets, etc., or any other relevant communication protocol. Further, IOSYS by Harman International Inc., which includes communicating information with frequency pulses, or possibly multiple frequencies that are outside of the human audible range, may also be used to communicate the command. The IOSYS pulses may be transmitted over the wires of a wired microphone connection. A digital signal of ones and zeros may be translated to an analog signal on a neighboring frequency in parallel to the signals carrying the voice/instrument sounds on a different wireless frequency (e.g., tone-key signals).

In the example shown in FIG. 1, a single button 185 is shown. In this implementation, the button 185 may be selected once in order to transmit the microphone identifier command having a channel indicator associated with the first channel. The button 185 may be depressed twice, consecutively, in order to transmit the microphone identifier having a channel indicator associated with the second channel. The button 185 may be depressed three times, consecutively, in order to transmit the command having a channel indicator associated with the third channel, and so on.

In another example, the button 185 may include multiple buttons, each associated with a specific console channel. For example, one button may be associated with a first channel, another with a second channel, and so on. The button 185 may be associated with the audio signals transmitted across the channels. Thus, each time one of the buttons 185 are depressed, a microphone identifier command may be transmitted. The microphone identifier command may be instruct the microphone associated with the respective channel to illuminate. Additionally or alternatively, one or more buttons may be presented via the console display 140, display strip 145, and/or mobile device display 160, as described in more detail below.

The audio system 100 may also include a mobile device 115. The mobile device 115 may be configured to communicate wirelessly with the console 105 and the microphones 110. The console 105, mobile device 115 and microphones 110 may communicate with one another via a wireless network such as Wi-Fi®, Bluetooth®, Zigbee, cellular networks, ad-hoc wireless networks, etc.

The mobile device 115 may be a portable device such as a mobile phone, tablet, personal digital assistant, e-reader, laptop computer, SmartWatch, etc. The mobile device 115 may include a processor 155 and database (not shown). The processor 155 is generally configured to execute a number of the functions associated with the mobile device 115 disclosed herein. The mobile device 115 may be configured to transmit signals wireless to the console 105 and/or the microphones 110. The mobile device 115 may also be configured to generate and transmit audible or audio based information via a mobile device speaker. The mobile device 115 may include a mobile device display 160 configured to present various displays and interfaces, to receive user input. The display 140 may be a touchscreen and respond to various user inputs such as to a user's finger, stylus, etc. The display 140 may also be a liquid crystal display (LCD), plasma panel, light emitting diode (LED) display, etc. The display 140 may display information and facilitate the user of the console 105 by users. An example display 140 and interface will be discussed in detail below with respect to FIGS. 3A, B.

Although not shown, a proxy device, such as a proxy server, may be used to receive and transmit signals between the console 105, mobile device 115 and microphones 110. The proxy device may be connected to the console 105 and the mobile device 115 via a wired or wireless connection (e.g., wireless network such as Wi-Fi®, Bluetooth®, Zigbee, cellular networks, ad-hoc wireless networks, etc.

A computing device 175 may be in communication with the console 105 via a wireless or hardwired connection. The computing device 175 may include a processor (not shown) and be configured to facilitate sound recording including the adjustment of channels in the console 105. At least one monitor 180 (or speaker 180) may also be in communication with the console 105. The monitor 180 may be a speaker for audibly generating the mixed audio signal by the console 105. Based on the sound emitted from the monitor 180, a user may adjust the audio signal using the console 105 accordingly.

The microphones 110 may include a microphone transceiver 170 and may be in communication with the console 105 via a wireless network. Additionally or alternatively, the microphones 110 may be coupled to the console 105 via a wired connection. The microphones 110 may be configured to receive and capture a vocal input signal from a user or singer. The received audio may be transmitted to the console 105 via the wireless or wired communication. The console 105 may then process the audio. The transceiver 170 may also facilitate other communication between the microphones 110 and the console 105, as described in more detail herein. For example, the transceiver 170 may be configured to receive the microphone identifier command identifying an illumination color. The microphone 110 may include a power supply (not shown) configured to supply power to the various microphone components.

The microphones 110 may include a microphone processor 195 configured to execute a number of the functions associated with the microphone 110. Such functions may include, but are not limited to, audio processing functions such as note, pitch and voice detection, control of various microphone parts such as power supplies (not shown), displays (as discussed with respect to FIGS. 3A, B), etc. The processor 195 may also be configured to process various incoming signals from the console 105. For example, the processor 195 may be configured to receive the microphone identifier command from the console 105, and in turn, instruct the display to illuminate according to the command.

Figure 2:
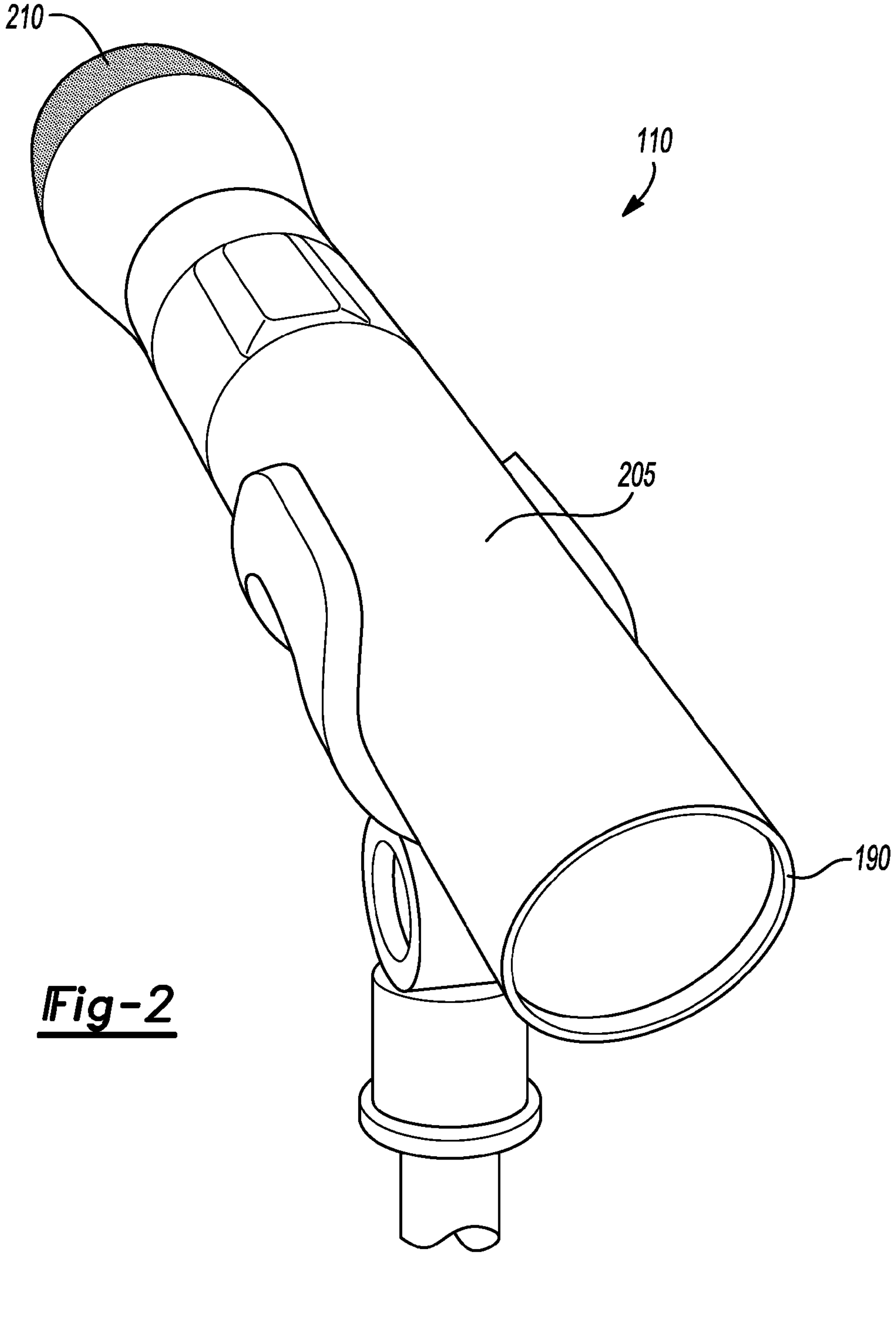
FIG. 2 illustrates an example microphone for the audio system in accordance with one embodiment.

Referring to FIGS. 1 and 2, the microphones 110 may each include a microphone display 190. The display 190, as shown by way of example in FIG. 2, may be an illuminating ring configured to illuminate in one of various colors at a circular base of the microphone 110. The illuminating ring may include one or more light emitting diodes (LED) configured to illuminate based on electrical power supplied to the LED. Each color may identify which of the console channels the specific microphone is associated with. For example, the display 190 may illuminate red, blue, yellow, green, and cyan. Other colors may also be created via the LED. Multiple LEDs of various colors may be included in the display 190 and may be used alone or in combination with each other to create various illumination colors. The microphone identifier command may identify the illumination color to be associated with a microphone on a specific channel. The processor 195 may instruct the display 190 to illuminate according to the identified illumination color. In one example, the processor 195 may supply power to a red LED to cause the display 190 to illuminate in a red color.

Additionally or alternatively, the display may be a panel display (not shown), or other display arranged on the microphone body 205. Such a panel display may be configured to present various interfaces via a touch screen, liquid crystal display (LCD), plasma panel, LED display, etc. The interfaces may present selectable options to a user during use of the microphone such as audio controls, set management, on/off switches, etc. The interfaces of the panel display may also be configured to illuminate in one of various colors.

The microphone 110 may also include a database (not shown) configured to maintain various information, settings, etc., specific to a particular microphone. For example, the database may maintain a channel association indicator indicating which console channel the microphone 110 is associated with. The channel association indicator may be pre-established during manufacturing. Additionally or alternatively, the channel association indicator may be established during set-up. For example, the channel association indicator may be selected at the mixing console 105 during set-up at a venue.

Referring now to FIG. 2, an example microphone 110 is illustrated. The microphone 110 may include a microphone body 205 and a windscreen 210. As explained, the microphone 110 may include a display 190 at an opposite end of the windscreen 210. The display 190 may be arranged at this end so that during use, when a singer is singing into the windscreen 210, the display 190 may be visible to the user at the mixing console 105. Thus, upon becoming illuminated in a specific color, the display 190 may indicate, via the illumination color, the channel associated with that microphone. Other implementations for the display 190 may be appreciated as well. For example, the display 190 may extend across the entire end of the microphone 110 instead of just the perimeter as shown in FIG. 2.

Furthermore, the display 190 may illuminate for a predefined period of time. The predefined period of time may be a predefined amount of time long enough for the user at the console 105 to realize which microphone 110 is illuminating, but short enough so as to not cause undo distractions to the audience during a performance. In one example, the predefined period of time may be approximate five (5) seconds. The predefined period of time may also be customizable at the console 105 or mobile device 115.

FIGS. 3A and 3B illustrate examples of interfaces for the display 140 of the console 105. The display 140, as explained, may be configured to show various interfaces for facilitating the use of the console 105. The interfaces may include information and data surrounding the mixing of audio signals. In addition, the interfaces, such as interface 305 in FIG. 3A, may display selectable buttons 185A-E (collectively referred to herein as buttons 185) relating to the identification of various devices (e.g., microphones 110) associated with certain console channels. For example, each channel, or each channel previously identified as being associated with one of the microphones 110, may be presented with or as the selectable buttons 185A-E.

Each button 185, upon selection, may be configured to instruct the transceiver 125 to transmit the wireless microphone identifier command. Further upon selection, each button 185 may be highlighted, or illuminated to show which button 185 was selected. The example interface 310 in FIG. 3B illustrates an example where the button 185C associated with the third channel was selected. In one example, the respective button may also change colors to that of the illumination color associated with the channel, thus matching that of the microphone display 190.

Although explained herein as being displayed via the console display 140, the interfaces 305, 310 may also be presented at the mobile device display 160, as well as the display strip 145.

In addition to selecting a specific button 185 associated with a specific channel, the display 140 may present various illumination option buttons (not shown) that may indicate an illuminating effect. Such effects may include a pulsation of the illumination. That is, the LED may pulse to aid in drawing the attention of the front of house engineer. In some examples the pulse may include a constant, uniform pattern of flashes. In another example the pulse may include a repetitive pattern of varying lengths of flashes such as a long flash followed by two short flashes. The rate of the pulse may be varied as well via the display 140. By varying the pulses and adding the option to do so from the console, the engineer may be able to customize the illumination. This may be especially helpful during performances where several visual effects are in place such as lighting, projections, large visual displays, etc., where a solid illumination of the microphone display 190 may not be noticeable or visible by the engineer.

The rate of the pulse may be selected by the engineer via the display 140. Additionally or alternatively, the engineer could send a command to increase or decrease the illumination intensity of the LED. The illumination options may be transmitted as part of the wireless microphone identifier command.

Figure 4:
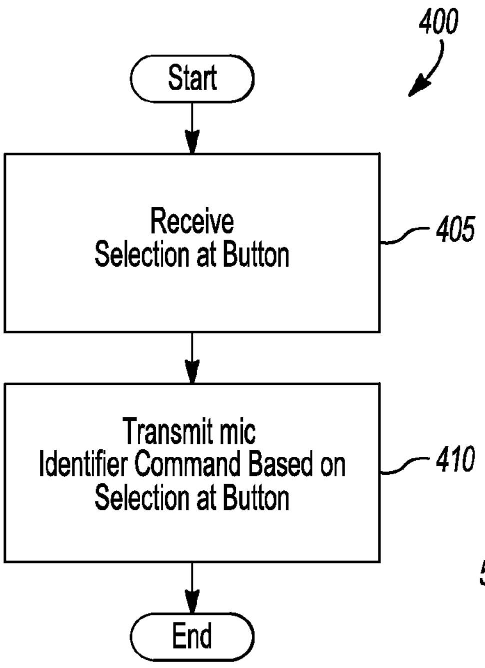
FIG. 4 illustrates an example process for the audio system in accordance with one embodiment.

FIG. 4 is a flow chart for the audio system 100. A process 400 may begin at block 405 where the processor 130 may receive an indication of a selection at the button 185. As explained above, the button 185 may be a single button configured to receive multiple, consecutive, depressions. The number of consecutive depressions may correspond to the channel to be identified (e.g., the third channel). Additionally or alternatively, various buttons 185 may be selectable via the console display 140, display strip 145, and/or the mobile device display 160, as illustrated by way of example in FIG. 3A.

At block 410, in response to receiving the button 185 selection, the processor 130 may instruct the transceiver to transmit the wireless microphone identifier command based on the button 185 selection. The microphone identifier command may include at least one of the channel indicators corresponding to the button 185 selection and the illumination color. The process 400 may then end.

Figure 5:
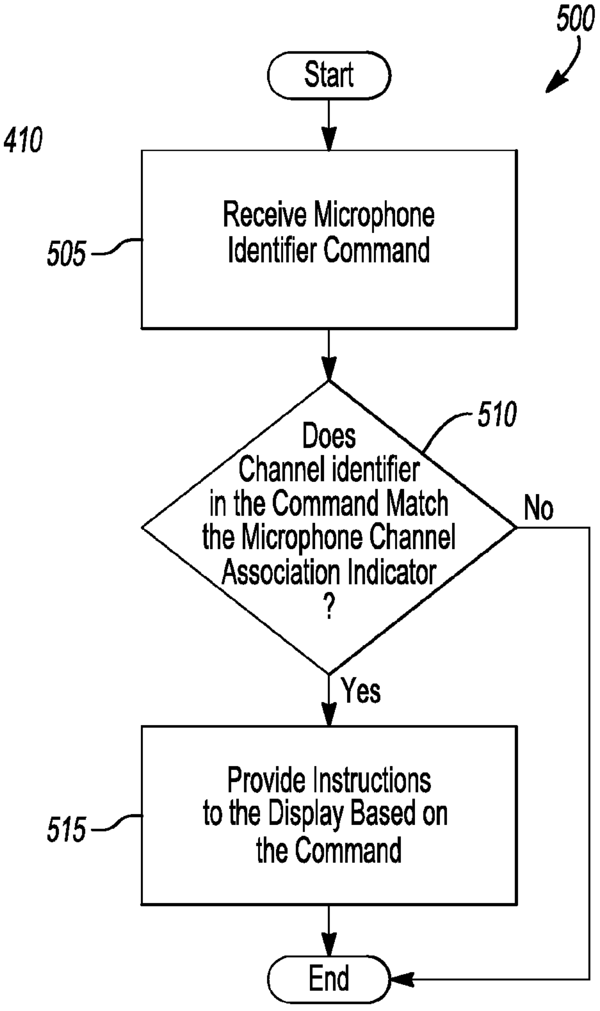
FIG. 5 illustrates another example process for the audio system in accordance with one embodiment.

FIG. 5 is a flow chart for the audio system 100 whereby the microphone 110 receives the microphone identifier command. The process 500 may begin at block 505 where the microphone 110 receives the microphone identifier command via the transceiver 170.

At block 510, the processor 195 may determine whether the channel identifier within the microphone identifier command matches the microphone channel association indicator within the microphone. That is, the processor 195 may determine whether the microphone identifier command identifies the channel that the microphone 110 is associated with. If so, the process 500 proceeds to block 515. If not, the processor 195 disregards the received command and the process ends.

At block 515, in response to the processor 195 determining that the microphone identifier command is intended for the microphone 110, the processor 195 may provide instructions to the microphone display 190. The instructions may include instructions to illuminate in the illumination color as identified in the command. The instructions may also include the predefined period of time that the display 190 is to be illuminated (e.g., approximately 5 seconds.) The process 500 may then end.

Accordingly, a flexible, customizable, easy-to-use audio system is disclosed herein for identifying channel associations of wireless microphones. In the example where microphones are often handed-off during and in between performances, the illumination eliminates the needs for the front of house engineer to listen to each channel individually to determine the channel assignments. This is time consuming, and cannot be completed until the performance has already begun. By allowing a quick and efficient way to identify the microphone channel assignments, a more accurate, easy to see, visual identification may be appreciated.

While the examples herein refer to a wireless microphone, a wired microphone may also enjoy the benefits of this disclosure. For example, the visual check could be performed to identify channel/microphone correlations during set up and identify and discrepancies.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for identifying associated channel assignments for wireless microphones, the apparatus, comprising:

a wireless microphone including a processor and a display, the processor configured to:

communicate with an audio mixing console;

receive a microphone identifier command including a channel indicator for indicating a mixing console channel and an illumination color corresponding to the channel indicator;

determine whether the wireless microphone is associated with the mixing console channel; and illuminate, in response to the wireless microphone being associated with the mixing console channel, the display according to the illumination color.

2. The apparatus of claim 1, wherein the display includes at least one light emitting diode configured to illuminate based on the illumination color.

3. The apparatus of claim 1, wherein the display is a circular ring arranged at a base of the wireless microphone.

4. The apparatus of claim 1, wherein the processor is further configured to illuminate the display according to the illumination color for a predefined amount of time.

5. The apparatus of claim 1, wherein the processor is further configured to determine whether the wireless microphone is associated with the mixing console channel as indicated by the channel indicator by comparing the channel indicator to a microphone channel association maintained by the microphone.

6. The apparatus of claim 1, wherein the wireless microphone is configured to receive the microphone identifier command from the audio mixing console in response to a user input at the audio mixing console.

7. The apparatus of claim 1, wherein the microphone identifier command is received via at least one of HiQNet™ protocol, IOSYS and tone-key signals.

8. A wireless microphone comprising:

a processor and a display, the processor configured to:

receive a microphone identifier command including a channel indicator for indicating a mixing console channel and an illumination color corresponding to the channel indicator;

determine whether the wireless microphone is associated with the mixing console channel; and illuminate, in response to the wireless microphone being associated with the mixing console channel, the display according to the illumination color.

9. The wireless microphone of claim 8, wherein the display includes at least one light emitting diode configured to illuminate based on the illumination color.

10. The wireless microphone of claim 8, wherein the display is a circular ring arranged at a base of the wireless microphone.

11. The wireless microphone of claim 8, wherein the processor is further configured to illuminate the display according to the illumination color for a predefined amount of time.

12. The wireless microphone of claim 8, wherein the processor is further configured to determine whether the wireless microphone is associated with the mixing console channel as indicated by the channel indicator by comparing the channel indicator to a microphone channel association maintained by the microphone.

13. The wireless microphone of claim 8, wherein the wireless microphone is configured to receive the microphone identifier command from an audio mixing console in response to a user input at the audio mixing console.

14. The wireless microphone of claim 8 wherein the microphone identifier command is received via at least one of HiQNet™ protocol, IOSYS protocol and tone-key signals.

15. The wireless microphone of claim 8, wherein the display includes at least one light emitting diode.

16. A method for identifying associated channel assignments for wireless microphones, comprising:

receiving a microphone identifier command including a channel indicator for indicating a mixing console channel and an illumination color corresponding to the channel indicator;

determine whether a wireless microphone is associated with the mixing console channel; and illuminate, in response to the wireless microphone being associated with the mixing console channel, a display on the wireless microphone according to the illumination color.

17. The method of claim 16, further comprising illuminating the display according to the illumination color for a predefined amount of time.

18. The method of claim 16, further comprising determining whether the wireless microphone is associated with the mixing console channel as indicated by the channel indicator by comparing the channel indicator with a microphone channel association maintained by the microphone.

19. The method of claim 16, further comprising receiving the microphone identifier command from an audio mixing console in response to a user input at the audio mixing console.

20. The method of claim 16, wherein the microphone identifier command is received via at least one of HiQNet™ protocol, IOSYS protocol and tone-key signals.

* * * * *